United States Patent
Thompson et al.

(10) Patent No.: US 6,571,253 B1
(45) Date of Patent: May 27, 2003

(54) HIERARCHICAL VIEW OF DATA BINDING BETWEEN DISPLAY ELEMENTS THAT ARE ORGANIZED IN A HIERARCHICAL STRUCTURE TO A DATA STORE THAT IS ALSO ORGANIZED IN A HIERARCHICAL STRUCTURE

(75) Inventors: Richard D. Thompson, Trumbull, CT (US); Paul M. Matchen, Pleasantville, NY (US); Stephen J. Boies, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,587

(22) Filed: Apr. 28, 2000

(51) Int. Cl.[7] ............................................... G06F 17/30
(52) U.S. Cl. ..................... 707/103; 707/100; 709/331; 709/332; 345/762; 345/764
(58) Field of Search .......................... 707/500, 10, 103, 707/100, 1; 709/331, 310, 332; 345/762, 764

(56) References Cited

U.S. PATENT DOCUMENTS

| | | | |
|---|---|---|---|
| 5,706,505 A | | 1/1998 | Fraley et al. |
| 6,009,436 A | * | 12/1999 | Motoyama et al. ............ 706/59 |
| 6,085,196 A | * | 7/2000 | Motoyama et al. .......... 707/102 |
| 6,177,936 B1 | * | 1/2001 | Cragun ........................ 345/760 |
| 6,279,015 B1 | * | 8/2001 | Fong et al. .................. 707/513 |
| 6,282,547 B1 | * | 8/2001 | Hirsch ......................... 345/804 |
| 6,330,006 B1 | * | 12/2001 | Goodisman .................. 345/762 |
| 6,463,442 B1 | * | 10/2002 | Bent et al. .............. 707/103 R |

* cited by examiner

*Primary Examiner*—Jean M. Corrielus
(74) *Attorney, Agent, or Firm*—Whitham, Curtis & Christofferson, P.C.; Stephen C. Kaufman

(57) ABSTRACT

A Web browser is used as the rendering engine for the client application. The browser is instructed to load a "page" (some set of instructions that eventually resolves to a sequence of HTML (HyperText Markup Language) tags which instruct the browser regarding the number/nature and layout of the controls desired) which the browser parses to produce a set of controls with the indicated containment hierarchy. These controls may contain definitions of data stores (such as the support for an XML (eXtended Markup Language) tag which produces a W3C compliant DOM (Docunent Object Model) with built-in parsing for XML documents) which may either locally define their data or cause the browser to request the data from a server on the network. Preferably, the browser then passes control to a data binding agent which will examine the controls for specification of desired data binding(s).

20 Claims, 3 Drawing Sheets

HIERARCHICAL VIEW OF DATA BINDING BETWEEN DISPLAY ELEMENTS THAT ARE ORGANIZED IN A HIERARCHICAL STRUCTURE TO A DATA STORE THAT IS ALSO ORGANIZED IN A HIERARCHICAL STRUCTURE

BACKGROUND OF THE INVENTION

1. Field of the Invention

The present invention generally relates to binding data in a computer system and, more particularly, to a method and system which exploit the hierarchical nature of both control organization and data storage with support for powerful expression to locate the data item of interest.

2. Background Description

Many computer applications find it preferable to link their controls to data in a manner that limits the need for each control to know what other controls are interested in the same data item. This preference is enhanced when the data is organized in a hierarchical manner (where a tree is the natural manner for viewing the data structure) in order to eliminate the need for a control to also know about other controls interested in the parent(s) of the data item. A further extension is often desired for when the data resides on one (logical) machine, the server, and the controls may exist on multiple machines, the clients.

Various approaches to this issue have been employed over time. In one approach, a client acquires a lock on the data, and all other clients are restricted to a read-only access. Upon write back of any changes on the first client, another client may claim the lock on the updated version of the data. While this approach is most often used at an application level in client/server systems, it can also be applied within an application where the "client" with the lock may be viewed as the control that currently has the focus for user input. The lock may even be implemented in an implicit mode (e.g., belongs to the control with focus) where the data is updated (and other interested controls notified) when the control loses focus.

In another approach, a binding agent keeps track of the logical links between data items and the controls, as disclosed, for example, in U.S. Pat. No. 5,706,505 to Fraley et al. for "Method and System for Binding Data in a Computer System". This agent is then responsible for reflecting changes in the controls to the data and notifying the controls whenever a linked data item is modified.

The present invention is primarily interested in the second of these two approaches, although it also has applicability to other means of logically linking data and controls. A significant limitation in the state of the art, as exemplified by the patent to Fraley et al., is a view of the data that is record oriented, often via a logical interface known as a cursor. While this is appropriate for data stored in many types of databases, it is very limiting for other types of data stores (such as World Wide Web Consortium (W3C) compliant Document Object Model (DOM)). Often it also ignores the hierarchical nature in which most state of the art display systems organize the controls being shown to a user.

SUMMARY OF THE INVENTION

It is therefore an object of the present invention to exploit the hierarchical nature of both control organization and data storage.

It is another object of the invention to provide ways to increase the expressive power for locating the data item of interest.

According to the invention, a Web browser (such as Internet Explorer, version 5 (v5), from the Microsoft Corp.) is used as the rendering engine for the client application. The browser is instructed to load a "page" (some set of instructions that eventually resolves to a sequence of HTML (HyperText Markup Language) tags which instruct the browser regarding the number/nature and layout of the controls desired) which the browser parses to produce a set of controls with the indicated containment hierarchy. These controls may contain definitions of data stores (such as the support for an XML (eXtended Markup Language) tag which produces a W3C compliant DOM with built-in parsing for XML documents) which may either locally define their data or cause the browser to request the data from a server on the network. Preferably, the browser then passes control to a data binding agent which will examine the controls for specification of desired data binding(s). This specification may include, but is not limited to, the following:

1. A specification of the context for starting the search for the indicated data item. Examples of such a specification include the identity within the browser of a data store (context taken as the root of the data store), identity of another control whose data binding should be used as the context, or a default, to examine the "parents" within the control hierarchy for the closest parent whose data binding could be used to set this context.

2. A specification of how to find a data item relative to the context specified in item 1, above. This is preferably in a syntax native to the data store (e.g., XSL (eXtensible Script Language) pattern or XPath expression when the data store is an W3C compliant DOM), although one skilled in the art could implement other syntax and supporting code for locating the desired data item. Examples of such a syntax include extending an XSL pattern by supporting a portion of the specification being replaced by data referenced off some control, data item, or computed by some function prior to evaluation by the native system.

3. A specification of what property on the control is to be "bound" to the data item where "bound" means that the value of the data item and the value of the property of the control are kept synchronized with each other. Support that defaults to this specification to be the rendered property can be quite useful. Also useful is permitting a specification that no property is to be "bound" to the data item although the control should still be registered as interested in changes to the data item.

4. A specification of code to execute whenever the bound data item changes. This notification allows the control to perform arbitrary actions on this notification. One skilled in the art can easily extend this to include both pre and post notification of changes as well as other useful means of informing the control that a change is occurring or has occurred.

5. A specification of code to execute whenever something has caused a change in the data item bound to the control. This allows the control to perform arbitrary actions based on this notification. One skilled in the art can easily extend this to include both pre and post notification of data binding changes as well as other useful means of informing the control that its data binding is changing or has changed.

The data binding preferably occurs after both the data and control structure are parsed into their respective DOM structures, but before the page is rendered for the user, although one skilled in the art can easily accomplish these ends in other circumstances.

In addition, this invention includes support for controls which may not be directly parsed and instantiated by the browser (e.g., computational code) and which may or may not have any associated display. These controls may register an interest in various data items and receive notifications when those data items change.

This invention also supports the data binding agent optionally creating a specified data item within the specified hierarchy should one not exist at the time the data binding agent executes.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

HyperText Markup Language (HTML) is the basic language for publishing hypertext on the World Wide Web (WWW). HTML is a structured markup language which means that the markup in a file has a particular structure that means something to applications that process it. An HTML browser, such as Internet Explorer v.5, displays the information in an HTML file based on this structure. The World Wide Web Consortium (W3C) has defined a complete set of objects to be used for processing HTML documents as trees. The specification for this set of objects is called the Document Object Model (DOM). In general, an HTML (or XML) document can be thought of as a tree structure, with the "contains" relationship in the document corresponding to a parent-child relationship in the tree.

HTML is not a programming language, per se, but rather a language of tags. Tags are commands to do something, such as where to place images, to structure text into headings, paragraphs, lists, hypertext links, etc., and typically begin with <command> and end with </command>, where "command" represents a specific command. For example, the words put into a "title" tag will display in the title bar of the browser.

HTML mostly addresses presentation of information by the browser, not the content of the information. The HTML tags describe how or in what context to display a particular piece of text. What that text actually means is lost in HTML. An eXtensible Markup Language (XML) document can be designed to express not simply how to display data, but what the data means. An XML document can be displayed in a browser, like an HTML document, but in addition a client-side application could also collect and use the data in the document.

Figure 1:
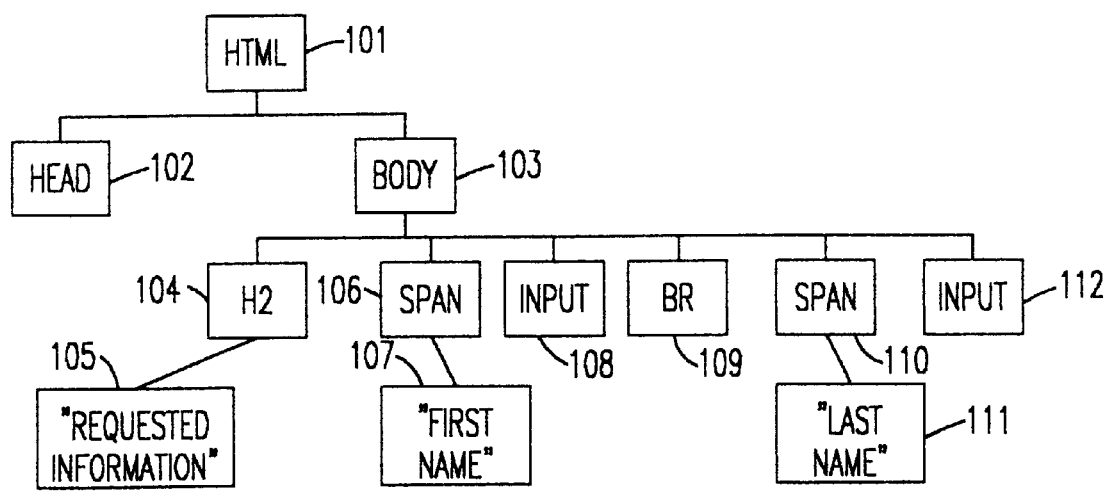
FIG. 1 is a block diagram representing the Document Object Model (DOM) for a simple HTML page.

Referring now to the drawings, and more particularly to FIG. 1, there is shown a block diagram representing the Document Object Model (DOM) for a simple HTML page. The HTML (HyperText Markup Language) tags to produce this are as follows:

```
<html>
    <head></head>
    <body>
        <h2>Requested Information</h2>
        <span>First name:</span>
        <input type= "text"></input>
        <br/>
        <span>Last name:</span>
        <input type= "text"></input>
    </body>
</html>
```

The controls for HTML tags above are organized by the browser into a DOM whose nodes may be represented by the block diagram of FIG. 1. Specifically, the child elements of html 101 are the head 102 and the body 103. The body, in turn, has several child elements. These are h2 104 which has a text child of "Requested Information" 105, the span 106 which has a text child of "First name" 107, the input 108, the br 109, the span 110 which has a text child of "Last name" 111, and the input 112. The "span" tag is used in HTML to support style sheets.

Figure 2:
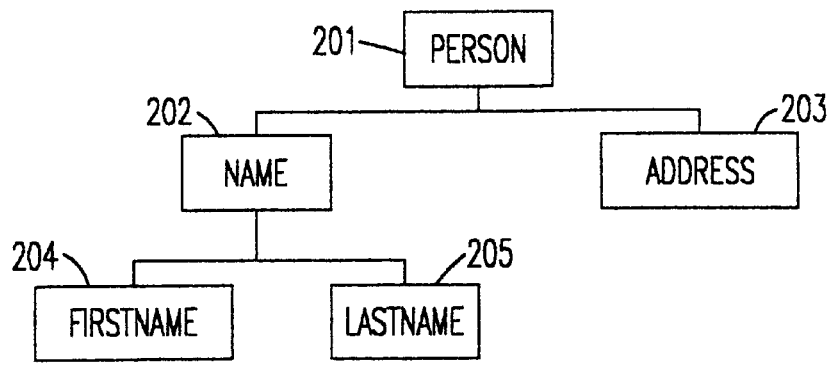
FIG. 2 is a block diagram representing the DOM for a sample hierarchical data store.

The XML that would be parsed to yield the DOM of FIG. 2 is the following:

```
<person>
    <name>
        <firstname/>
        <lastname/>
    </name>
    <address/>
</person>
```

Here, person 201 has child elements name 202 and address 203.

Additionally, name 202 has child elements firstname 204 and lastname 205.

A simple extension of the HTML from that given above (with changes shown in italics) to include the data and specify how the data is to be bound within Internet Explorer v5.0 would be as follows:

```
<html>
    <head></head>
    <body>
        <!- include the data ->
        <xml id= "Data">
            <data>
                <person>
                    <name>
                        <firstname/>
                        <lastname/>
                    </name>
                    <address/>
                </person>
            </data>
        </xml>
        <h2>Requested Information</h2>
        <span>First name:</span>
        <input type= "text" dataSrc="Data"
               dataFld="person/name/firstname"></input>
        <br/>
```

-continued

```
        <span>Last name:</span>
        <input type= "text" dataSrc="Data"
                    dataFld="person/name/lastname"></input>
    </body>
</html>
```

In particular, the input fields now uses the dataSrc attribute to indicate that it is to be bound to the XML data store with an ID of "Data". The syntax for identifying the XML data store could be arbitrarily complex. For example, a syntax of "top.dataFrame#DataIsland1" might be used to indicate that the XML data store has an ID of "DataIsland1" and that is instantiated in the frame "top.dataFrame". The example input fields also use the dataFld attribute to indicate that the node of interest within the data store (e.g., the first input field uses "person/name/firstname").

By introducing a span to wrap the related input fields, we change (changes in italics) the above in a manner that exploits the hierarchical nature of both the controls and data and provides a useful indirection for the data binding. The changed HTML is:

```
<html>
    <head></head>
    <body>
        <!- include the data ->
        <xml id= "Data">
            <data>
                <person>
                    <name>
                        <firstname/>
                        <lastname/>
                    </name>
                    <address/>
                </person>
            </data>
        </xml>
        <h2>Requested Information</h2>
            <!- container to set data binding context ->
            <!- =>delete dataSrc on input tags so controls will use
                parent's context ->
        <span dataSrc="Data" dataFld="person/name"
                dataproperty=" ">
            <span>First name:</span>
            <input type= "text" dataFld= "firstname"></input>
            <br/>
            <span>Last name:</span>
            <input type= "text" dataFld="lastname"></input>
        </span>
    </body>
</html>
```

The above coding uses the hierarchical nature of the controls (the spans and inputs have been moved into a new container (a span)). While such containment is normally used to associate these controls for layout reasons, this invention extends the containment concept to include the default context the data binding agent uses to locate the node of interest for each of the controls. Any one of these controls could have overridden this default context either by separately specifying the data store to use (using the dataSrc attribute) or by specifying some other control whose data binding should be used to set the context (using the dataparentid attribute to specify the ID of the context setting control).

Figure 3:
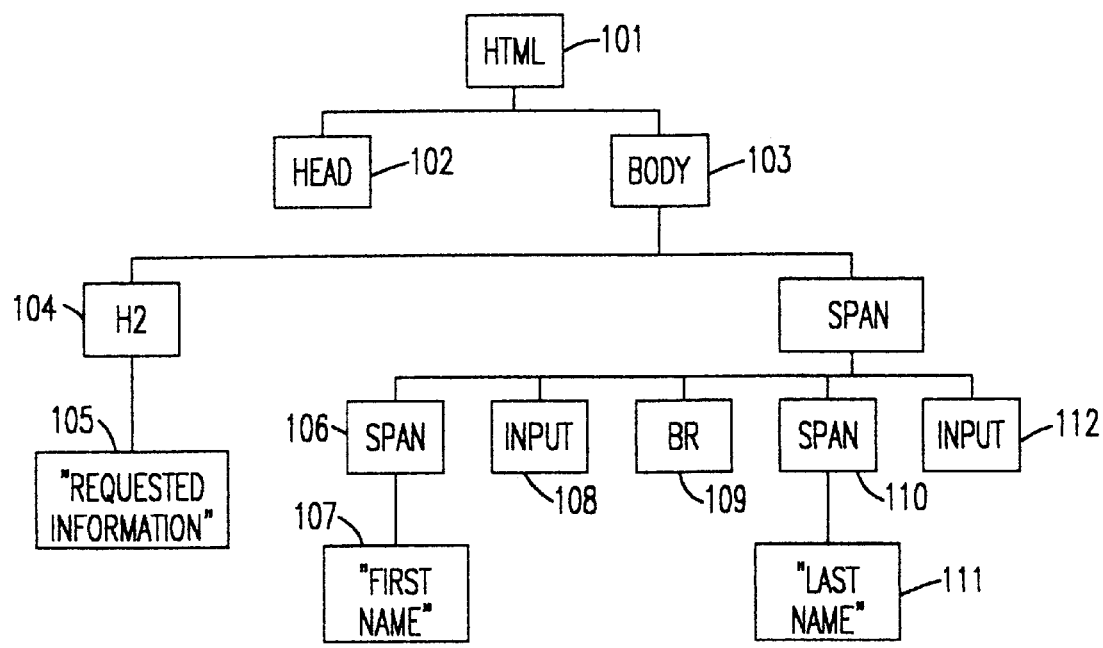
FIG. 3 is a block diagram representing the DOM with a transformed control hierarchy according to the invention.
Figure 4:
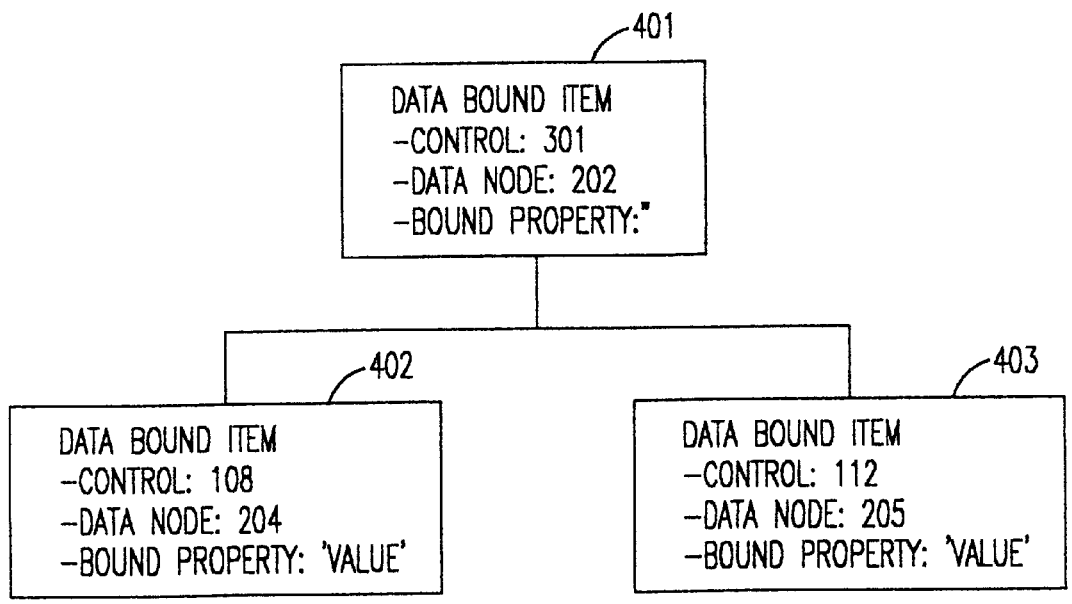
FIG. 4 is a block diagram representing the data binding hierarchy introduced by the invention.

The effect of these changes has been to transform the control hierarchy from FIG. 1 to that of FIG. 3 with the addition of span 301 while introducing the data binding hierarchy shown in FIG. 4. In particular, FIG. 4 shows the data binding hierarchy for the example shown in FIGS. 3 and 2. The parent 401 has a data bound item including control 301 and data node 202. The parent 401 has two child elements, 402 and 403. Child element 402 has a data bound item including control 108 and data node 204, and child element 403 has a data bound element including control 112 and data node 205. While this is marginally useful in this trivial example, one skilled in the art will note that the expressive power of this data binding hierarchy is equivalent to an indirection in referencing objects in other programming languages.

The following adds the concepts of event handlers for when the data item's value is changed by some other means than the synchronization with this control and for when the data binding of the control is changed. This example just pops up an alert window with a message, but one skilled in the art will understand this to be any action the HTML author desires:

```
<html>
    <head></head>
    <body>
        <!- include the data ->
        <xml id= "Data">
            <data>
                <person>
                    <name>
                        <firstname/>
                        <lastname/>
                    </name>
                    <address/>
                </person>
            </data>
        </xml>
        <h2>Requested Information</h2>
            <!- container to set data binding context ->
            <!- =>delete dataSrc on input tags so controls will use
                parent's context ->
        <span>
            <span>First name:</span>
            <input type="text" dataFld="firstname" ondatabind=
                    "alert('First name data bound!')"
                    ondatachange="alert('Bound data field
                    for first name changed by someone
                    else!')"></input>
            <br/>
            <span>Last name:</span>
            <input type="text" dataFld="lastname"></input>
        </span>
    </body>
</html>
```

In summary, the data binding concepts implemented in Internet Explorer version 5 from Microsoft Corporation have been significantly expanded to include:

1. Full support for specifying the data node of interest using the syntax native to the data store.
2. Support for the specification of the data node of interest being relative to the data node bound to another control's rather than the root of the data store. This support includes both implicit (data binding hierarchy follows control hierarchy) and explicit (control specifies another control as the parent in the data binding hierarchy) specification of the data binding hierarchy.
3. Support for a control specifying what property of the control should be synchronized with the value of the bound data node (including specifying that no property should be so bound).
4. Support for notifying a control whether the value of the bound data node changes.

5. Support for notifying a control whenever the data node it is bound to changes.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system providing a hierarchical view of data binding between display elements to a data store comprising:
    a source of display elements organized in a hierarchical structure;
    a data store organized in a hierarchical structure; and
    a data binding agent providing support for linking a hierarchy of controls to a hierarchy of data items where the data binding process exploits the hierarchical nature of both the controls and the data store, the links established being bidirectional in that changes to the data item are reflected to the control and changes to the control are reflected to the data item.

2. A system according to claim 1, wherein the controls and their hierarchy are specified in HyperText Markup Language (HTML).

3. A system according to claim 1, wherein the data store is a World Wide Web Consortium (W3C) compliant Document Object Model (DOM).

4. A system according to claim 1, wherein the specification for locating the data item of interest may specify any level of the hierarchy of data items.

5. A system according to claim 4, wherein the specification syntax is an eXtensible Script Language (XSL) pattern.

6. A system according to claim 4, wherein the specification syntax is an Xpath expression.

7. A system according to claim 1, wherein the specification of the data store for a control's data binding may reference an object in another frame or window provided it is accessible to the data binding agent.

8. A system according to claim 1, wherein the property of the control bound to the data item defaults to the property the control renders on the display.

9. A system according to claim 1, wherein the property of a control bound to the data item is specified by the control.

10. A system according to claim 1, wherein the control specifies code to be executed when data events occur including before change, after change, before rebind and after rebind.

11. A method providing a hierarchical view of data binding between display elements to a data store comprising the steps of:
    organizing a source of display elements in a hierarchical structure;
    organizing a data store in a hierarchical structure; and
    providing support for linking a hierarchy of controls to a hierarchy of data items with a data binding agent where the data binding process exploits the hierarchical nature of both the controls and the data store, the links established being bidirectional in that changes to the data item are reflected to the control and changes to the control are reflected to the data item.

12. A method according to claim 11, wherein the controls and their hierarchy are specified in HyperText Markup Language (HTML).

13. A method according to claim 11, wherein the data store is a World Wide Web Consortium (W3C) compliant Document Object Model (DOM).

14. A method according to claim 11, wherein the specification for locating the data item of interest may specify any level of the hierarchy of data items.

15. A method according to claim 14, wherein the specification syntax is an eXtensible Script Language (XSL) pattern.

16. A method according to claim 14, wherein the specification syntax is an Xpath expression.

17. A method according to claim 11, wherein the specification of the data store for a control's data binding may reference an object in another frame or window provided it is accessible to the data binding agent.

18. A method according to claim 11, wherein the property of the control bound to the data item defaults to the property the control renders on the display.

19. A method according to claim 11, wherein the property of a control bound to the data item is specified by the control.

20. A method according to claim 11, wherein the control specifies code to be executed when data events occur including before change, after change, before rebind and after rebind.

* * * * *